United States Patent Office 3,249,441
Patented May 3, 1966

3,249,441
PELLETIZED FEED PRODUCTION
John B. Reynolds and Louis E. Craig, Pryor, Okla., assignors, by mesne assignments, to Nipak, Inc., Dallas, Tex., a corporation of Texas
No Drawing. Filed May 7, 1962, Ser. No. 192,951
13 Claims. (Cl. 99—2)

This invention relates to pelleted urea-containing animal feeds and to improvements in the method of producing such feeds.

Urea is used very extensively as a component of manufactured feeds, especially feeds for ruminant animals. Such feeds are commonly produced and sold in pelleted form and it is in connection with problems which arise when urea is used in the production of pelleted feeds that the present invention is directed.

In the production of pelleted feeds, various feed components which may be, typically, soybean meal, feather meal, wheat middlings, limestone, rock phosphate, molasses, cottonseed meal, animal fat, wheat bran, salt, and trace minerals are fed into a pelleting mill of the type commonly used in pelleting feeds in which extruded pellets of feed are formed by forcing the mixed feed components through a perforated die. One example of such pelleter is commercially available under the name Simplex 500.

Now, when urea is a component of compositions used to produce pelleted feeds, one of the problems that arises is the decrease in production rate of the pelleted feeds. For example, when urea is used in quantities of about 5% of the total mixed feed and higher, there is a commonly known, and marked reduction in the tons per hour of feed that can be pelleted in any given pellet mill. As a matter of fact, reductions in production rates of 20% and 30% are not uncommon, and reductions of as much as 50% have been reported.

Another problem associated with urea-containing pelleted feeds is the marked tendency they have to cake in storage.

In attempts to minimize the caking tendency, it is common practice in the production of feed-grade urea consisting of crystalline or granular urea, to "condition" it by mixing it with finely divided dolomitic limestone, kaolin clay, wheat mixed feeds, rice bran, and similar products, or combinations thereof. The particle sizes of such feed-grade urea products are such that substantially all will pass a 16 or 20 mesh U.S. Standard sieve, with the most suitable products generally containing little or no material which passes a 100 mesh Standard sieve.

The above-mentioned conditioning agents are ordinarily added so as to result in a feed-grade urea composition having a minimum nitrogen content of 42%, and a typical nitrogen content of about 42.2%. To achieve this the conditioning agents are added to the urea at a level of around 9% by weight, and a typical good quality feed-grade urea is composed of granular crystalline urea which has been conditioned with about 4% of dry, finely-divided kaolin clay and about 5% of rice bran. Such a product will be referred to hereinafter as "regular feed-grade urea."

Such conditioning of feed-grade urea products, i.e., by the addition of limestone, kaolin clay, wheat mixed feeds, rice bran, while minimizing, somewhat, the caking tendency of the urea, does not have much of an effect in increasing the production rates of pelleted feeds made with such urea.

We have now found, in accordance with our invention, that treating crystalline, granular urea with calcium stearate prior to its incorporation in the feed mix which goes into the pelleting mill has a profound effect in boosting the pelleting rates so that they are similar to those when using formulations that contain no urea. Furthermore, the calcium stearate treatment acts to reduce the caking tendencies of pelleted feeds containing the urea.

In its most preferred form we add finely-divided calcium stearate to the granular-crystalline urea, follow this with a thorough mixing, and then add kaolin clay and rice bran.

It is important that the calcium stearate be added to the pure crystalline, granular urea before the other conditioning agents are added, since addition of calcium stearate to "regular feed-grade urea" does not give as satisfactory results. Furthermore, addition of calcium stearate at levels similar to those used on the urea itself, to a complete mixed feed just before pelleting, gives no substantial change in pelleting results. It is therefore very important that, to obtain the best results, the application of calcium stearate to the pure crystalline, granular urea should be followed by the addition of other conditioning agents such as kaolin clay and rice bran, and subsequently utilizing this calcium stearate-treated urea as a component of pelleted animal feeds and in particular, pelleted ruminant feeds.

Other stearates besides calcium stearate may be used providing they are not toxic or otherwise dangerous or undesirable, as for example the stearates of magnesium, aluminum, zinc, copper, ferric, manganese and cobalt. Furthermore, salts of fatty acids other than stearic may be used, including oleic, linoleic, palmitic, myristic and lauric acids.

When calcium stearate is used, quantities of about 0.05% by weight to 0.5% by weight have been found effective, with the optimum level being in the range of from about 0.1% to about 0.25% by weight of urea. Quantities less than 0.1% are harder to handle because of the difficulty in obtaining uniform distribution of the calcium stearate throughout the mass of urea particles, while levels above 0.5% appear unnecessary and wasteful.

Thorough mixing of the calcium stearate and the urea is necessary in order to obtain best results, and for this purpose the calcium stearate should be as finely divided as possible. The finer the particle size the easier and quicker is it applied to the urea.

Our invention will be further understood when considered in light of the following detailed examples which are presented here for illustrative purposes only, and are not to be construed in a limiting sense.

*Example 1*

A particular ruminant feed was prepared both from regular feed-grade urea and from calcium stearate-treated feed-grade urea containing calcium stearate at the level of about 0.1% by weight based on the urea. The formulation used was as follows.

| Ingredient: | Parts |
|---|---|
| Soybean meal | 61 |
| Feather meal | 8 |
| Wheat middlings | 7 |
| Feed-grade urea | 5.3 |
| Limestone | 5 |
| Rock phosphate | 3.5 |
| Molasses | 3 |
| Cottonseed meal | 3 |
| Animal fat | 1 |
| Wheat bran | 1 |
| Salt | 1 |
| Fura Meal 40 | 1 |
| Trace minerals | 0.2 |
| | 100.0 |

The feed was pelleted with a 75 horsepower pellet mill wherein the die used was 2½" thick and provided with 12/64" holes. Operating conditions were kept essentially identical for pelleting two lots of the feed that differed only in the type of feed urea used. With the regular feed-grade urea, the production rate was 1.78 tons of pelleted feed per hour. With the calcium stearate-treated feed-grade urea containing calcium stearate at the 0.1% level, the production rate was 2.62 tons per hour; this represents a 47% increase in production rate by use of the calcium stearate-treated feed-grade urea.

*Example 2*

Pelleting tests similar to those of Example 1 were carried out with another ruminant feed formulation made up with regular feed-grade urea and with calcium stearate-treated feed-grade urea containing calcium stearate at the 0.1% level. The following formulation was used.

| Ingredient: | Parts |
|---|---|
| Soybean meal | 60 |
| Feed-grade urea | 9 |
| Linseed oil meal | 5 |
| Cottonseed meal | 5 |
| Salt | 5 |
| Dicalcium phosphate | 4 |
| Cane molasses | 2 |
| Corn molasses | 2 |
| Corn gluten feed | 2 |
| Wheat bran | 2 |
| Calcium carbonate | 2 |
| Sodium sulfate | 1 |
| Trace minerals and vitamins | 1 |
| | 100 |

In this case, the tests were carried out with a 100 horsepower pellet mill with a die having 12/64" holes. When operating conditions were adjusted to give an optimum production rate with regular feed-grade urea, the production was 3.71 tons per hour of pelleted feed. With the same operating conditions, substitution of the formulation with calcium stearate-treated feed-grade urea containing calcium stearate at the 0.1% level gave a production rate of 3.94 tons per hour; this was a 6% increase in production rate. It was then found possible to change operating conditions on the pellet mill with the calcium stearate-treated urea formulation to increase the production rate to 5.18 tons per hour; this is a 39% increase over the maximum production rate possible with the formulation containing the regular feed-grade urea.

*Example 3*

Still another test was carried out with a 100 horsepower pellet mill having a die 1¾" thick and provided with 13/64" holes. The feed formulations used contained two levels of feed-grade urea, 1.25% by weight and 3.0% by weight. Again, formulations were made up with regular feed-grade urea and with calcium stearate-treated feed-grade urea (0.1% level of calcium stearate).

A calibrated variable speed feeder was used to control the rate of flow of the feed to the pelleting chamber. The rate was adjusted with each lot of feed mix to give the maximum production rate of pelleted feeds. The feeder setting was a measure of production rate. The results obtained were as follows:

| Urea used | Feeder Setting | |
|---|---|---|
| | Formulation with 1.25 percent urea | Formulation with 3.0 percent urea |
| Regular | 9.30 | 9.25 |
| Calcium Stearate-Treated | 9.60 | 9.60 |

The maximum possible feeder setting was 9.60. Therefore, these data show that calcium stearate-treated feed-grade urea resulted in at least 3% and 4% increases in production rates at the two levels of urea.

*Example 4*

Additional tests were carried out with a 2 horsepower laboratory pellet mill. The die used was 1¾" thick with 12/64" holes. The feed formulation used was as follows:

| Ingredient: | Parts |
|---|---|
| Cottonseed meal | 45 |
| Soybean meal | 17 |
| Feather meal | 10 |
| Feed-grade urea | 6 |
| Wheat bran | 5 |
| Dehydrated alfalfa | 5 |
| Molasses | 3 |
| Calcium carbonate | 5 |
| Defluorinated phosphate rock | 3 |
| Salt | 1 |
| | 100 |

The same formulation was used to prepare mixes with regular feed-grade urea and with calcium stearate-treated feed-grade urea (0.1% calcium stearate level). Operating conditions were established with a mix containing regular feed-grade urea and, without changing conditions, the mix was changed to one containing calcium stearate-treated feed-grade urea. Results of four comparative tests were as follows:

| | Production rate, parts per 5 min. | | Percent increase in production rate |
|---|---|---|---|
| | Regular feed urea | Calcium stearate-treated feed urea | |
| Test 1 | 1,748 | 2,012 | 15 |
| Test 2 | 1,596 | 1,702 | 7 |
| Test 3 | 2,213 | 2,610 | 18 |
| Test 4 | 1,779 | 1,915 | 8 |
| | | | ¹ 12 |

¹ Average.

*Example 5*

A lot of feed-grade urea was prepared by adding calcium stearate, rice bran and kaolin clay all at the same time to granular, crystalline urea. This special feed-grade urea, regular feed-grade urea and calcium stearate-treated feed-grade urea (0.1% calcium stearate level) were used in identical feed formulations to prepare three lots of mixed feeds which were pelleted in the mill described in Example 3. The feeder setting again was used as a measure of pelleting rates. The results were as follows:

| Urea used | Feeder setting | |
|---|---|---|
| | Formulation with 1.25 percent urea | Formulation with 3.0 percent urea |
| Regular Feed-Grade Urea | 9.30 | 9.25 |
| Calcium Stearate-Treated | 9.60 | 9.60 |
| Special Urea of Example 5 | 9.10 | 9.30 |

Whereas the calcium stearate-treated feed-grade urea gave an increased pelleting rate, the special urea where the calcium stearate, kaolin clay and rice bran were all added to the urea at the same time, either resulted in a decreased or not significantly different pelleting rate.

Example 6

A pelleting test with the laboratory pellet mill described in Example 4 was carried out with a batch of feed, also with the formulation of Example 4. Regular feed-grade urea was used in the formulation. To half of this lot of feed was added 0.1% by weight of calcium stearate followed by thorough mixing. Pelleting of these two feed mixtures gave the following production rates:

|  | Production rate, parts per hr. |
|---|---|
| Basic feed | 2297 |
| Basic feed+0.1% calcium stearate | 2214 |

No increase (actually an apparent 3-4% decrease) in pelleting rate resulted from addition of the calcium stearate to the complete feed mix.

Example 7

Three lots of a pelleted ruminant feed were made in the same pellet mill used in Example 3. Identical formulations were used except for the feed-grade urea. In one lot, regular feed-grade urea was used. In another lot, calcium stearate-treated, feed-grade urea containing a 0.25% by weight of calcium stearate was used. In the third lot, calcium stearate-treated feed-grade urea containing 0.5% by weight of calcium stearate was used.

All three lots of pelleted feeds were placed in metal storage bins immediately after production. When the three lots of pelleted feeds were removed from the bins, the two lots made from calcium stearate-treated feed-grade urea were removed with considerably less difficulty from the caking standpoint as compared with the lot from the regular feed-grade urea. There was no noticeable difference between the two lots made from feed-grade urea containing the two levels of calcium stearate.

Example 8

Six lots of pelleted ruminant feeds were prepared in the pellet mill used in Example 3. These were comprised of two lots each of a 25%, 32% and 43% protein feeds containing 1.25%, 3% and 5%, respectively, by weight of feed-grade urea. One lot of each was made with regular feed-grade urea; the other lot of each was made with calcium stearate-treated feed-grade urea containing 0.5% by weight of calcium stearate.

The pelleted feeds were placed in metal storage bins. When they were removed, the lots prepared with calcium separate-treated feed-grade urea were caked much less than the corresponding lots made with regular feed-grade urea.

Example 9

Four lots of pelleted ruminant feeds were prepared with the formulation and pellet mill described in Example 2. The four lots differed in the feed-grade urea used. One contained the regular feed-grade urea. The other three contained calcium stearate-treated feed-grade urea containing levels of 0.1%, 0.25% and 0.5% of calcium stearate.

The production rates of the pelleted feeds made with the calcium stearate-treated urea were markedly better than that of the feed made with regular feed-grade urea. There was a slight increase in production rates of the pelleted feeds with the higher levels of calcium stearate.

The pelleted feeds were placed in metal storage bins as they were produced. When the feeds were removed from the bins, there was noticeably less caking of the feed made from the feed-grade urea containing 0.5% calcium stearate. There was somewhat more caking in the case of the feed from the feed-grade urea containing 0.25% calcium stearate and still more caking in the cases of the feed made from regular feed-grade urea and from the feed-grade urea with the 0.1% level of calcium stearate.

We claim:
1. A composition for incorporation in animal feeds prior to pelleting such feeds which comprises granular-crystalline urea which has been first uniformly mixed with from about 0.05% to 0.5% by weight of an agent consisting essentially of finely divided calcium stearate to form a uniform mixture, and which has then been mixed with a dry anti-caking agent.
2. The composition of claim 1 wherein the said anti-caking agent is kaolin clay.
3. The composition of claim 1 wherein the said anti-caking agent is wheat mixed feeds.
4. The composition of claim 1 wherein the said anti-caking agent is rice bran.
5. The composition of claim 1 wherein the said anti-caking agent is a mixture of at least two materials from the group consisting of kaolin clay, wheat mixed feeds, and rice bran.
6. The composition of claim 1 wherein said anti-caking agent is present in amount of about 9% by weight of the urea.
7. In the method of producing pelleted animal feeds, in which method a urea-containing animal feed formulation is pelleted in a pellet mill, the improvement which comprises admixing the said urea in granular form, prior to its incorporation in said feed formulation, with finely divided calcium stearate to form a uniform mixture, and then mixing the resulting mixture of urea and calcium stearate with a dry anti-caking agent.
8. The method of claim 7 in which said anti-caking agent is kaolin clay.
9. The method of claim 7 in which said anti-caking agent is rice bran.
10. The method of claim 7 in which said anti-caking agent is a mixture of at least two materials selected from the group consisting of kaolin clay, wheat mixed feeds, and rice bran.
11. In the method of producing a pelleted animal feed, in which method an animal feed formulation containing solid urea and including other solid feed components is pelleted in a pellet-mill, the improvement comprising mixing crystalline urea with finely divided calcium stearate prior to mixing said urea with any of said other solid feed components of said formulation.
12. The method in accordance with claim 11, wherein the amount of calcium stearate used is between about 0.05% and 0.5% by weight, based on the weight of said urea.
13. A composition for incorporation in pelletable animal feed formulations prior to pelleting the latter, comprising granular urea which has been first uniformly mixed with a minor proportion of finely divided calcium stearate, and which has then been mixed with a dry anti-caking agent.

References Cited by the Examiner

UNITED STATES PATENTS

| 71,961 | 12/1867 | Blodgett | 99—2 |
| 2,560,830 | 7/1951 | Turner | 99—2 |
| 2,861,886 | 11/1958 | Colby | 99—2 |
| 2,928,737 | 3/1960 | Fincher | 99—2 |

OTHER REFERENCES

Handbook of Feedstuffs, Seiden & Pfander, 1957; pp. 552, 398.

A. LOUIS MONACELL, *Primary Examiner.*

BEATRICE H. STRIZAK, *Examiner.*

S. J. BAICKER, *Assistant Examiner.*